(12) United States Patent
Kim et al.

(10) Patent No.: US 9,972,859 B2
(45) Date of Patent: May 15, 2018

(54) METHOD FOR PREPARING CATHODE ELECTROLYTE FOR REDOX FLOW BATTERIES, AND REDOX FLOW BATTERY

(71) Applicant: LOTTE CHEMICAL CORPORATION, Seoul (KR)

(72) Inventors: Mi-Kyoung Kim, Daejeon (KR); Eun-Mi Choi, Daejeon (KR); Dae-Sik Kim, Daejeon (KR); Wooin Jang, Daejeon (KR); Taehyuk Kang, Seoul (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 58 days.

(21) Appl. No.: 15/309,843

(22) PCT Filed: May 20, 2015

(86) PCT No.: PCT/KR2015/005056
§ 371 (c)(1),
(2) Date: Nov. 9, 2016

(87) PCT Pub. No.: WO2015/182917
PCT Pub. Date: Dec. 3, 2015

(65) Prior Publication Data
US 2017/0271705 A1    Sep. 21, 2017

(30) Foreign Application Priority Data
May 26, 2014   (KR) .................. 10-2014-0063170

(51) Int. Cl.
*H01M 8/18*       (2006.01)
*H01M 8/04276*    (2016.01)
(Continued)

(52) U.S. Cl.
CPC ......... *H01M 8/188* (2013.01); *H01M 8/0273* (2013.01); *H01M 8/0289* (2013.01);
(Continued)

(58) Field of Classification Search
CPC combination set(s) only.
See application file for complete search history.

(56) References Cited

U.S. PATENT DOCUMENTS 6,143,443 A  * 11/2000 Kazacos ............... H01M 8/188
                                                429/188
6,468,688 B2 * 10/2002 Kazacos ............. B60L 11/1879
                                                429/101
(Continued)

FOREIGN PATENT DOCUMENTS

CN        101562256        10/2009
CN        101800339         8/2010
(Continued)

OTHER PUBLICATIONS

PCT Search Report & Written Opinion, Patent Cooperaton Treaty, dated Jul. 24, 2015, PCT Application No. PCT/KR2015/005056.
(Continued)

*Primary Examiner* — Kaity Chandler
(74) *Attorney, Agent, or Firm* — Lex IP Meister, PLLC

(57) ABSTRACT

The present disclosure relate to a method for preparing a cathode electrolyte for redox flow batteries including the steps of: forming a first cathode electrolyte by reducing vanadium pentoxide ($V_2O_5$) in an acidic solution in the presence of a specific reducing compound; forming a second cathode electrolyte by reducing vanadium pentoxide ($V_2O_5$) in an acidic solution in the presence of a linear or branched aliphatic alcohol having 2 to 10 carbon atoms; and mixing the first cathode electrolyte and the second cathode electro-
(Continued)

lyte, and to a redox flow battery including the cathode electrolyte obtained by the preparation method.

13 Claims, 4 Drawing Sheets

(51) Int. Cl.
  *H01M 8/0289* (2016.01)
  *H01M 8/0258* (2016.01)
  *H01M 8/0273* (2016.01)
(52) U.S. Cl.
  CPC ... *H01M 8/04276* (2013.01); *H01M 8/04283* (2013.01); *H01M 2300/0011* (2013.01)

(56) References Cited

U.S. PATENT DOCUMENTS

| | | | | |
|---|---|---|---|---|
| 6,872,376 | B2* | 3/2005 | Tanaka | C01G 31/00 423/544 |
| 7,078,123 | B2* | 7/2006 | Kazacos | B60L 11/1879 429/101 |
| 9,406,961 | B2* | 8/2016 | Kim | H01M 8/188 |
| 2001/0028977 | A1* | 10/2001 | Kazacos | B60L 11/1879 429/105 |
| 2002/0119090 | A1 | 8/2002 | Tanaka et al. | |
| 2012/0282509 | A1 | 11/2012 | Shigematsu | |
| 2013/0095362 | A1 | 4/2013 | Keshavarz et al. | |
| 2015/0056525 | A1 | 2/2015 | Lee et al. | |

FOREIGN PATENT DOCUMENTS

| | | |
|---|---|---|
| JP | 08-064223 | 3/1996 |
| JP | 08-148177 | 6/1996 |
| JP | 2002-193621 | 7/2002 |
| JP | 2003-040622 | 2/2003 |
| JP | 2013-523589 | 6/2013 |
| JP | 2014-532284 | 12/2014 |
| JP | 2015-522913 | 8/2015 |
| KR | 10-2011-0064058 | 6/2011 |
| KR | 10-1130575 | 4/2012 |
| KR | 10-2012-0132620 | 12/2012 |
| KR | 10-2013-0107845 | 10/2013 |
| KR | 10-1367618 | 3/2014 |
| WO | 95-12219 | 5/1995 |
| WO | 2013-177414 | 11/2013 |

OTHER PUBLICATIONS

EPO, Extended European Search Report of EP 15799015.1 dated Oct. 23, 2017.

* cited by examiner

[FIG. 1]
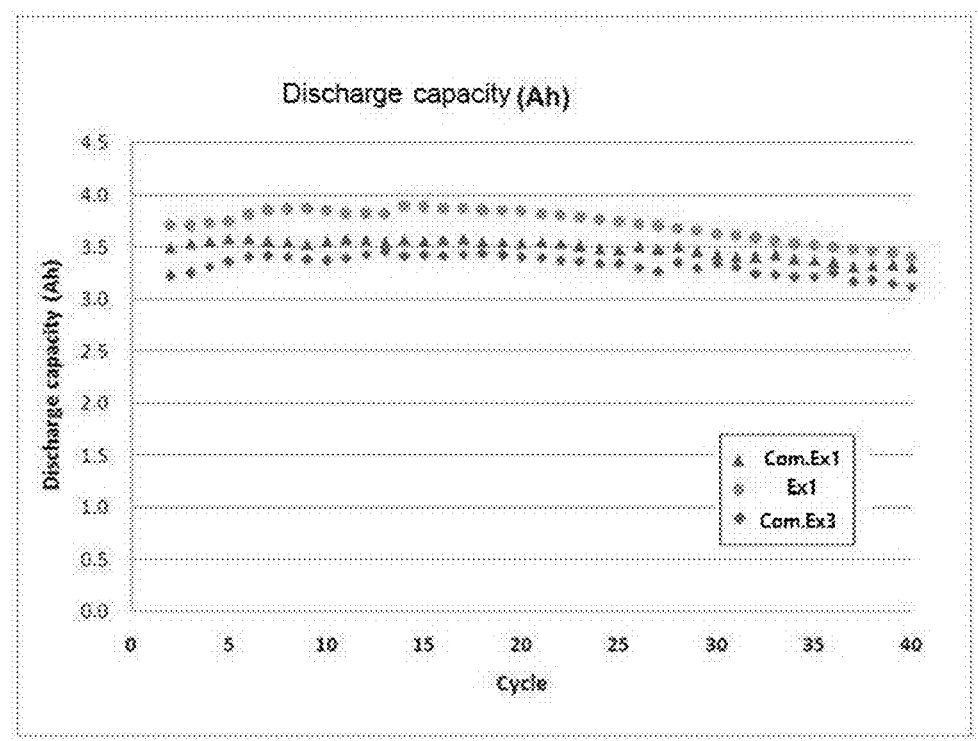

[FIG. 2]
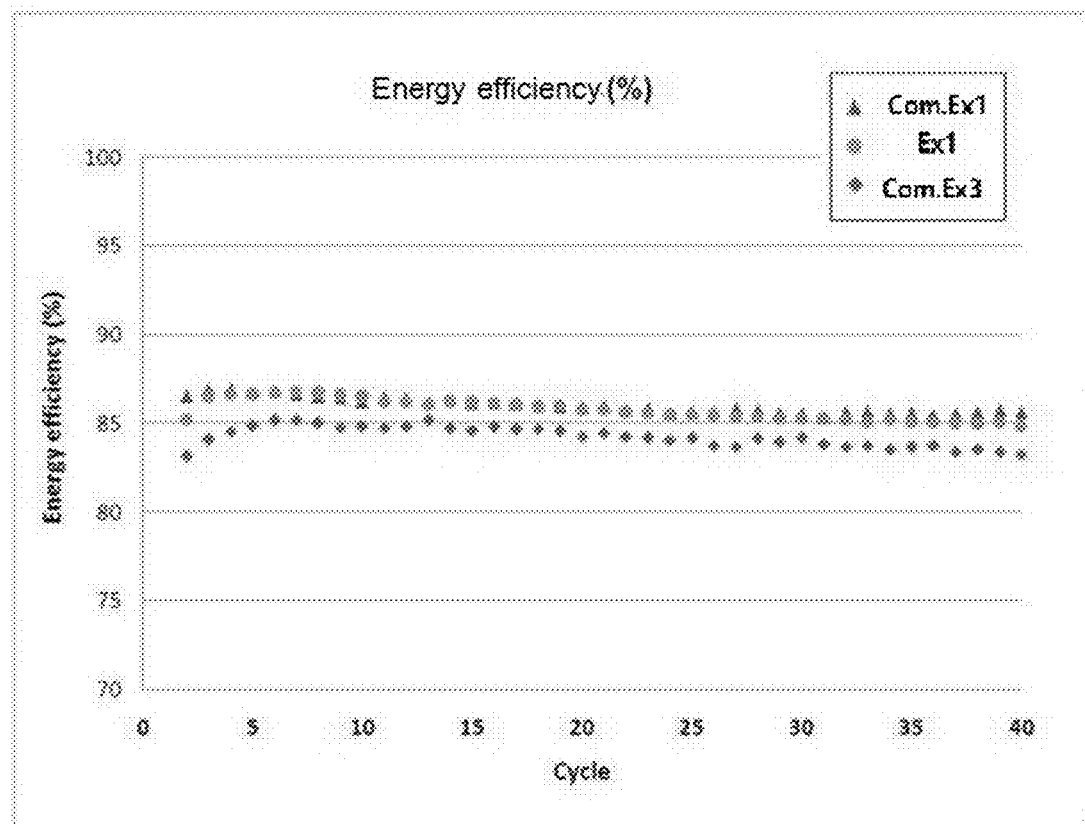

[FIG.3]
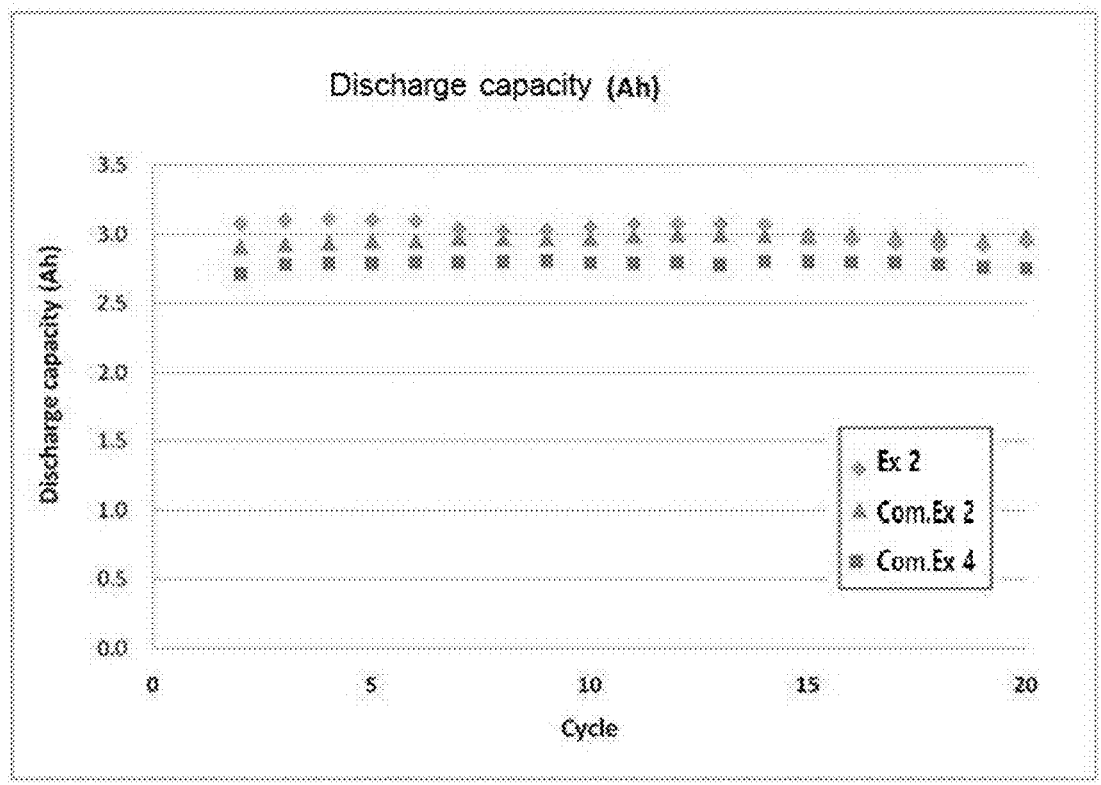

[FIG.4]
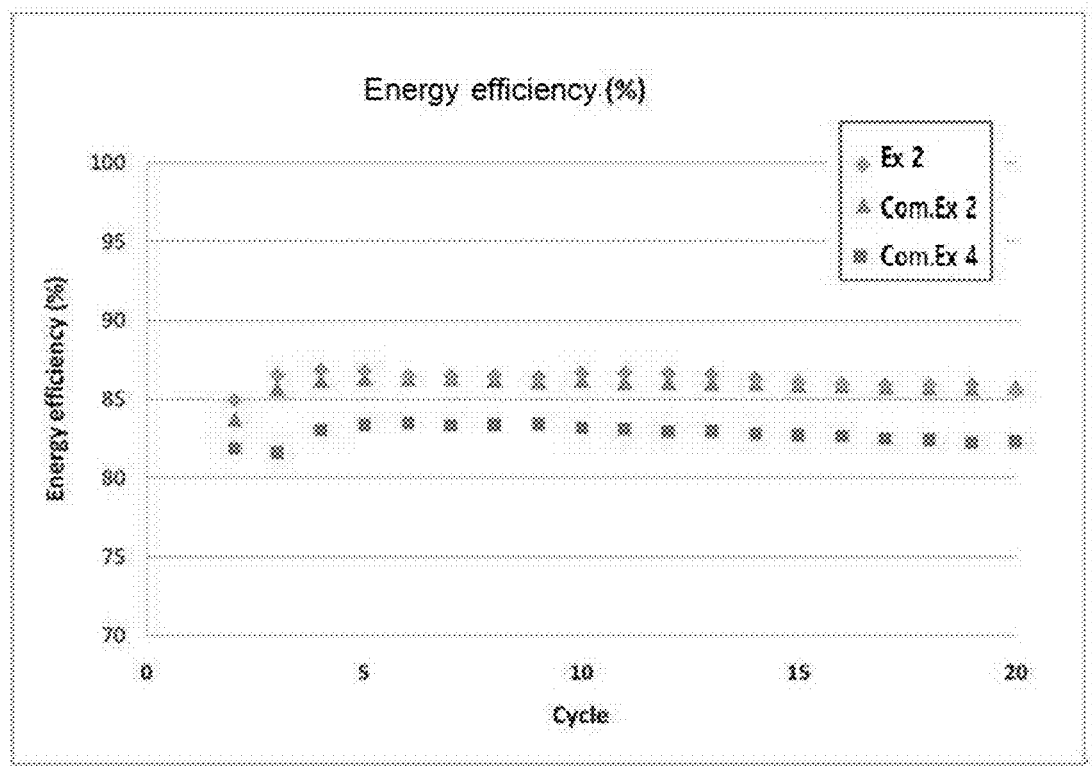

METHOD FOR PREPARING CATHODE ELECTROLYTE FOR REDOX FLOW BATTERIES, AND REDOX FLOW BATTERY

TECHNICAL FIELD

The present invention relates to a method for preparing a cathode electrolyte for redox flow batteries, and a redox flow battery. More particularly, the present invention relates to a method for preparing a cathode electrolyte for redox flow batteries in which the cathode electrolyte can exhibit excellent performance, such as improved energy efficiency, and has a relatively long replacement cycle because the efficiency or performance of a battery does not deteriorate significantly even in the long-term use, and to a redox flow battery including the cathode electrolyte for redox flow batteries, obtained by the preparation method.

BACKGROUND OF ART

Existing power generation systems, such as with thermal power generation emitting a large amount of greenhouse gases and environmental pollutants by using fossil fuels, and with nuclear power plants entailing their stability issues and hazardous waste processing, have come to various destined breaking points. In response thereto, research efforts have increased significantly to develop environmentally friendlier, higher efficiency energy sources, and a power supply system using the same.

In particular, power storage technology has been the focus of research and development activities for broadening the usability of renewable energy sources against their significant susceptibility to external conditions and for enhancing the efficiency of power utilization, wherein secondary batteries receive more intensive interest and their research and development efforts are actively made.

A redox flow battery refers to an oxidation/reduction cell capable of converting chemical energy of an active substance directly into electrical energy, and it represents an energy storage system adapted to store new and renewable energy with large output variations according to environmental conditions such as sunlight and wind, and to convert the same into high-quality power.

Specifically, the redox flow battery has electrolytes containing an active material that causes an oxidation/reduction reaction, and that circulate between opposite electrodes and a storage tank, to perform charging and discharging.

Such a redox flow battery typically includes tanks containing active materials in different oxidized states, a pump for circulating the active materials during charge/discharge, and unit cells partitioned by a separation membrane, wherein the unit cell includes electrodes, an electrolyte, a current collector, and a separation membrane.

The electrolyte includes an active material that undergoes the oxidation/reduction process for enabling the charge/discharge operation, serving as an important factor to determine the battery capacity.

For example, a vanadium flow battery has an electrolyte solution composed of four kinds of ions with different oxidation numbers.

When driving the redox flow battery, a difference in reaction rates between an anode and a cathode may lead to an imbalance of concentration of metal ions (for example, vanadium ions), which causes a concentration difference and a volume difference between the electrodes.

When the balance between the electrolyte solutions collapses, there is a problem in that the absolute amount of redox pairs that can substantially participate in reaction is reduced, so the performance and charge retention rate of a battery are reduced, and electrolyte solutions should be replaced.

In order to solve the above problem, conventionally, methods of applying a predetermined additive to an electrolyte have been known.

For example, Korean Unexamined Patent Publication No. 2012-0132620 discloses a method for improving energy density of a redox flow battery in which the charging state of the redox flow battery is enhanced using an electrolyte solution containing metal ions, such as manganese ions, lead ions, cerium ions, or cobalt ions, so as to increase the usage rate of vanadium (V) ions in the electrolyte solution, thereby improving the energy density of the redox flow battery.

PRIOR ART DOCUMENT

Patent Document (Patent Document 1) Korean Unexamined Patent Publication No. 2012-0132620

DETAILED DESCRIPTION OF THE INVENTION

Technical Problem

For resolving the aforesaid problems of the prior arts, it is an object of the present invention to provide a method for preparing a cathode electrolyte for redox flow batteries in which the cathode electrolyte can exhibit excellent performance, such as improved energy efficiency, and has a relatively long replacement cycle because the efficiency or performance of a battery does not deteriorate significantly even in long-term use.

It is another object of the present invention to provide a redox flow battery including the cathode electrolyte for redox flow batteries, obtained by the preparation method.

Technical Solution

Provided herein is a method for preparing a cathode electrolyte for redox flow batteries including the steps of: forming a first cathode electrolyte by reducing vanadium pentoxide ($V_2O_5$) in an acidic solution in the presence of at least one reducing compound selected from the group consisting of dicarboxylic acid containing a linear or branched alkylene group having 0 to 6 carbon atoms, hydrazine, and L-ascorbic acid; forming a second cathode electrolyte by reducing vanadium pentoxide ($V_2O_5$) in an acidic solution in the presence of a linear or branched aliphatic alcohol having 2 to 10 carbon atoms; and mixing the first cathode electrolyte and the second cathode electrolyte.

There is also provided a redox flow battery including: a cathode electrolyte for redox flow batteries prepared by the preparation method; metal ions containing a $V^{2+}/V^{3+}$ redox couple; and an anode electrolyte containing a sulfuric acid solution.

Hereinafter, the method for preparing a cathode electrolyte for redox flow batteries and the redox flow battery according to specific embodiments of the disclosure will be described in more detail.

According to an embodiment of the invention, a method for preparing a cathode electrolyte for redox flow batteries is provided, including the steps of: forming a first cathode electrolyte by reducing vanadium pentoxide ($V_2O_5$) in an acidic solution in the presence of at least one reducing compound selected from the group consisting of dicarboxylic acid containing a linear or branched alkylene group having 0 to 6 carbon atoms, hydrazine, and L-ascorbic acid; forming a second cathode electrolyte by reducing vanadium pentoxide ($V_2O_5$) in an acidic solution in the presence of a linear or branched aliphatic alcohol having 2 to 10 carbon atoms; and mixing the first cathode electrolyte and the second cathode electrolyte.

The present inventors found through experiments that, when using a cathode electrolyte for redox flow batteries, which is obtained by mixing two kinds of electrolytes formed by respectively reducing vanadium pentoxide in the presence of the above-described specific reducing compound and aliphatic alcohol, a redox flow battery including this cathode electrolyte can exhibit excellent performance, such as more improved energy efficiency, has a relatively long replacement cycle because the efficiency or performance of the redox flow battery does not greatly deteriorate even in long-term use, and the internal resistance of the redox flow battery is slightly decreased. Based on such a finding, the present invention was completed.

When using two kinds of electrolytes obtained by using a specific reducing compound and aliphatic alcohol, the discharge capacity and energy efficiency of the redox flow battery is more improved, the internal resistance of the redox flow battery is more lowered, and the efficiency or performance of the redox flow battery does not greatly deteriorate even when the operation cycle of the redox flow battery increases, compared to when using an electrolyte using each of the specific reducing compound and aliphatic alcohol.

The first cathode electrolyte and the second cathode electrolyte may be mixed in a volume ratio of 12:1 to 1:1 or 10:1 to 2:1. When the amount of the first cathode electrolyte is larger than the amount of the second cathode electrolyte, the resistance of the cathode electrolyte for redox flow batteries, prepared according to this embodiment, may be lowered.

When the amount of the second cathode electrolyte is larger than the amount of the first cathode electrolyte, the hydrogen ion concentration of an electrolyte solution may be decreased, or the resistance of the electrolyte solution may be increased.

The concentrations of the acidic solution in the first cathode electrolyte and the second cathode electrolyte may be 0.1 M to 6 M.

The acidic solutions in the first cathode electrolyte and the second cathode electrolyte may contain sulfuric acid, respectively.

The concentrations of vanadium pentoxide in the first cathode electrolyte and the second cathode electrolyte may be 0.3 M to 3 M, respectively.

When the concentration of metal ions in the cathode electrolyte is too low, it is difficult for the redox flow battery to have sufficient charge and discharge capacities or to exhibit sufficient energy efficiency as a commercially available battery, and thus it may be technically disadvantageous.

Further, when the concentration of metal ions in the cathode electrolyte is too high, vanadium is easily precipitated, the stability of the cathode electrolyte with respect to temperature greatly deteriorates, and the ratio of available charge and discharge capacity to the amount of vanadium active material used decreases, so it may be technically disadvantageous.

The concentration of the reducing compound in the first cathode electrolyte may be 0.3 M to 3 M.

Further, the concentration of the aliphatic alcohol in the second cathode electrolyte may be 0.3 M to 3 M.

When the concentration of the reducing compound or the aliphatic alcohol is too low, the reduction of the vanadium pentoxide ($V_2O_5$) present is not performed, or unreacted vanadium is present in the form of a solid powder, and thus it may be technically disadvantageous.

Further, when the concentration of the reducing compound or the aliphatic alcohol is too high, the reducing compound or the aliphatic alcohol is present in an electrolyte solution to cause undesired side reactions, or is present in the electrolyte solution in the form of a gel in which the reducing compound or the aliphatic alcohol is coagulated with vanadium powder, and thus it may be technically disadvantageous.

The ratio of the concentration of the reducing compound relative to the concentration of the vanadium pentoxide in the first cathode electrolyte may be 0.8 to 1.2.

Further, the ratio of the concentration of the aliphatic alcohol relative to the concentration of the vanadium pentoxide in the second cathode electrolyte may be 0.8 to 1.2.

When the concentration of the reducing compound or the aliphatic alcohol is too low compared to the concentration of the vanadium pentoxide, the reduction of the vanadium pentoxide ($V_2O_5$) present is not performed, or unreacted vanadium is present in the form of a solid powder, and thus it may be technically disadvantageous.

Further, when the concentration of the reducing compound or the aliphatic alcohol is too high compared to the concentration of the vanadium pentoxide, the reducing compound or the aliphatic alcohol is present in the electrolyte solution to cause undesired side reactions, or is present in the electrolyte solution in the form of a gel in which the reducing compound or the aliphatic alcohol is coagulated with vanadium powder, and thus it may be technically disadvantageous.

Meanwhile, the vanadium pentoxide ($V_2O_5$) may be reduced in an acidic solution in the presence of the reducing compound. The method, apparatus, and specific reduction method, which can be used in such a reduction process, is not particularly limited.

For example, the reduction may be performed by adding vanadium pentoxide ($V_2O_5$) and a reducing compound to an acidic solution in a temperature range of 0° C. to 100° C., and the vanadium pentoxide ($V_2O_5$) in the acidic solution may be reduced through an electrochemical reaction.

However, the content related to the reduction of vanadium pentoxide ($V_2O_5$) is not limited thereto.

Specific examples of the dicarboxylic acid containing a linear or branched alkylene group having 0 to 6 carbon atoms may include oxalic acid, malonic acid, succinic acid, glutaric acid, adipic acid, pimelic acid, suberic acid, and mixtures of two or more kinds thereof.

Meanwhile, according to another embodiment of the invention, a redox flow battery is provided, including: a cathode electrolyte for redox flow batteries obtained by the preparation method of a cathode electrolyte for redox flow batteries according to the above-described embodiment; metal ions containing a $V^{2+}/V^{3+}$ redox couple; and an anode electrolyte containing a sulfuric acid solution.

The present inventors found through experiments that, when using a cathode electrolyte for redox flow batteries, which is prepared by the preparation method of a cathode electrolyte for redox flow batteries according to the above-described embodiment, a redox flow battery including this cathode electrolyte can exhibit excellent performance, such as more improved energy efficiency, has a relatively long replacement cycle because the efficiency or performance of the redox flow battery does not greatly deteriorate even in long-term use, and the internal resistance of the redox flow battery is slightly decreased. Based on such a finding, the present invention was completed.

The sulfuric acid concentration of each of the first cathode electrolyte and the second cathode electrolyte may be 6 M or lower, for example, 1 M to 6 M.

The $V^{2+}/V^{3+}$ redox couple contained in the anode electrolyte may be obtained from materials capable of producing vanadium metal ions that are commonly known in the art, for example, $V_2O_5$, $VOSO_4$, and $NH_4VO_3$.

The metal ions containing the $V^{2+}/V^{3+}$ redox couple may have a concentration of 0.3 M to 3 M.

When the concentration of metal ions in the anode electrolyte is too low, it is difficult for the redox flow battery to have sufficient charge and discharge capacities or to exhibit sufficient energy efficiency as a commercially available battery.

Further, when the concentration of the metal ions in the anode electrolyte is too high, vanadium is easily precipitated, the stability of the anode electrolyte with respect to temperature greatly deteriorates, and the ratio of available charge and discharge capacities relative to the amount of vanadium active material used may be decreased.

The redox flow battery may include at least one unit cell, the unit cell including: a separation membrane through which ions pass; a pair of electrodes opposite to the center of the separation membrane; and the cathode electrolyte and the anode electrolyte which are respectively present in a cathode cell and an anode cell partitioned by the separation membrane.

The redox flow battery may further include a module including one or more of the unit cells.

The unit cell may further include a pair of flow frames attached to face each other on respective sides of the separation membrane.

The pair of flow frames may not only serve as moving channels of an electrolyte, but may also provide uniform distribution of an electrolyte solution between electrodes and a separation membrane such that the electrochemical reaction of a battery can be easily performed.

The flow frame may have a thickness of 0.1 mm to 10.0 mm, and may be composed of a polymer such as polyethylene, polypropylene, or polyvinyl chloride.

The unit cell may further include a cell frame formed on the outer surface of the electrodes.

The redox flow battery may further include: a cathode electrolyte tank for storing the cathode electrolyte; a cathode electrolyte pump for circulating the cathode electrolyte from the cathode electrolyte tank to the cathode cell of the unit cell during charge and discharge; an anode electrolyte tank for storing the anode electrolyte; and an anode electrolyte pump for circulating the anode electrolyte from the anode electrolyte tank to the anode cell of the unit cell during charge and discharge.

The redox flow battery of one embodiment may have internal resistance of 1.20 $\Omega$*cm$^2$ or less, or 1.10 $\Omega$*cm$^2$ or less.

Advantageous Effects

According to the present invention, a method for preparing a cathode electrolyte for redox flow batteries can be provided, in which the cathode electrolyte can exhibit excellent performance, such as improved energy efficiency, and has a relatively long replacement cycle because the efficiency or performance of a battery does not greatly deteriorate even in long-term use, and a redox flow battery including the cathode electrolyte for redox flow batteries, obtained by the preparation method can be provided.

BRIEF DESCRIPTION OF THE DRAWINGS

FIG. 1 is a graph showing discharge capacities of redox flow batteries of Example 1 and Comparative Examples 1 and 3 according to operation cycles.

FIG. 2 is a graph showing energy efficiencies of redox flow batteries of Example 1 and Comparative Examples 1 and 3 according to operation cycles.

FIG. 3 is a graph showing discharge capacities of redox flow batteries of Example 2 and Comparative Examples 2 and 4 according to operation cycles.

FIG. 4 is a graph showing energy efficiencies of redox flow batteries of Example 2 and Comparative Examples 2 and 4 according to operation cycles.

DETAILED DESCRIPTION OF THE EMBODIMENTS

Hereinafter, the present invention will be described in more detail with reference to the following examples. However, these examples are set forth only to illustrate the present invention, and the scope of the present invention is not limited thereto.

EXAMPLES AND COMPARATIVE EXAMPLES: PREPARATION AND OPERATION OF REDOX FLOW BATTERY

Single cells were assembled by using the components shown in Table 1 below, and a redox flow battery was operated according to the charging/discharging conditions shown in Table 1 below while injecting the cathode electrolyte and anode electrolyte prepared in examples and comparative examples at about 100 ml.

TABLE 1

Single cell components and charging/discharging conditions

| | Items | | |
|---|---|---|---|
| Single cell components | Electrode | Maker (product name) | SGL (GFD 3) |
| | Separation membrane | Maker (product name) | GEFC (104) |
| | Bipolar plate | Thickness (mm) | 3 |
| | | Effective area (cm$^2$) | 35 |

TABLE 1-continued

Single cell components and charging/discharging conditions

| Items | | |
|---|---|---|
| Charging/discharging conditions | Charging/discharging voltage | 1.0 V-1.6 V |
| | Charging/discharging current | 50 mA/cm$^2$ |

2. Electrolytes of examples and comparative examples were prepared by the following method.

Example 1

(1) Preparation of First Cathode Electrolyte 1.8 mol of oxalic acid anhydride was injected into 0.5 L of a 10 M sulfuric acid solution, and was completely dissolved until the solution became a clear liquid at about 60° C. Then, a small amount (1.8 mol) of vanadium pentoxide having purity of 98% or more was injected to perform a stepwise redox reaction. After the completion of the reaction, distilled water was added to 1 L, and residual suspended materials were removed by filtration under reduced pressure to prepare a first cathode electrolyte.

(2) Preparation of Second Cathode Electrolyte 5 mol of vanadium pentoxide having purity of 98% or more was slowly dissolved in 5 mol of 95% sulfuric acid to form a slurry, and 0.5 L of a 0.72 M aqueous ethanol solution was slowly injected at 60° C.-100° C. to perform a stepwise redox reaction. Then, residual ethanol was volatilized at 120° C. or higher and distilled water was added and diluted to 1 L. The diluted reaction product was filtered under reduced pressure to prepare a second cathode electrolyte.

Example 2 and Comparative Examples 1 to 4

Cathode electrolytes were prepared in the same manner as in Example 1, except that a redox couple and a reducing compound or alcohol was added to a sulfuric acid solution according to the conditions shown in Tables 2 and 3 below.

[Preparation of Anode Electrolyte]

The same amount of electrolyte V(IV) was injected into both electrodes of an electrochemical cell, which was then subjected to an electrochemical reaction in which the electrochemical cell was charged with a current of 50 mA/cm$^2$ to 1.6 V in a first step, charged with a current of 20 mA/cm$^2$ to 1.6 V in a second step, and charged with a current of 8 mA/cm$^2$ or less to 1.7 V in a third step, thereby preparing an anode electrolyte containing pure trivalent vanadium ions and sulfuric acid in the anode of this cell.

This anode electrolyte was injected into the battery of Table 1 above, and the operation of this battery was performed.

TABLE 2

Preparation of cathode electrolytes of Examples 1 and 2

| | | Classification | | | |
|---|---|---|---|---|---|
| | | Example 1 | | Example 2 | |
| | | First cathode electrolyte | Second cathode electrolyte | First cathode electrolyte | Second cathode electrolyte |
| Cathode electrolyte | Concentration [M] of $V^{4+}/V^{5+}$ redox couple | 1.8 | 1.8 | 1.5 | 1.5 |
| | Concentration [M] of sulfuric acid | 5 | 5 | 5 | 5 |
| | Reducing compound or alcohol | Oxalic acid 1.8M | Ethanol 1.8M | Oxalic acid 1.5M | Ethanol 1.5M |
| Volume ratio of first cathode electrolyte to second cathode electrolyte | | 7:3 | | 9:1 | |

TABLE 3

Preparation of cathode electrolytes of Comparative Examples 1 to 4

| | | Classification | | | |
|---|---|---|---|---|---|
| | | Comparative Example 1 | Comparative Example 2 | Comparative Example 3 | Comparative Example 4 |
| Cathode electrolyte | Concentration [M] of $V^{4+}/V^{5+}$ redox couple | 1.8 | 1.5 | 1.8 | 1.5 |
| | Concentration [M] of sulfuric acid | 5 | 5 | 5 | 5 |
| | Reducing compound | Oxalic acid 1.8M | Oxalic acid 1.5M | Ethanol 0.72M | Ethanol 0.6M |

3. Operation Results of Redox Flow Batteries of Examples and Comparative Examples The results of operating a redox flow battery using the electrolytes obtained in Example 1 and 2 and Comparative Examples 1 to 4 respectively are shown in Tables 4 to 9 below. Further, the operation results thereof are compared and shown in FIGS. 1 to 4.

(1) Energy efficiency (EE)=[discharge energy (Wh)/charge energy (Wh)]*100

(2) Charge efficiency (CE)=[discharge capacity (Wh)/charge capacity (Wh)]*100

(3) Voltage efficiency (VE)=[energy efficiency/charge efficiency]*100

(4) V utility rate (AhL/mol): vanadium (V) utility rate was calculated by the following General Formula 1.

$$\text{V utility rate } (Ah\text{L/mol}) = \text{discharge capacity } (Ah) \text{ of the cycle/molar concentration (mol/L) of vanadium} \quad \text{[General Formula 1]}$$

TABLE 4

Operation results of redox flow battery using the electrolyte of Comparative Example 1

| Operation cycle | Charge capacity (Ah) | Discharge capacity (Ah) | EE (%) | CE (%) | VE (%) | V utility rate (AhL/mol) |
|---|---|---|---|---|---|---|
|  | 3.71 | 3.57 | 87 | 96 | 90 | 1.98 |
| 10 | 3.75 | 3.63 | 86 | 97 | 89 | 2.02 |
| 20 | 3.75 | 3.61 | 86 | 96 | 89 | 2.01 |
| 40 | 3.52 | 3.37 | 86 | 96 | 89 | 1.87 |
| 70 | 2.95 | 2.84 | 84 | 96 | 88 | 1.57 |
| 100 | 2.70 | 2.59 | 84 | 96 | 87 | 1.48 |

TABLE 5

Operation results of redox flow battery using the electrolyte of Example 1

| Operation cycle | Charge capacity (Ah) | Discharge capacity (Ah) | EE (%) | CE (%) | VE (%) | V utility rate (AhL/mol) |
|---|---|---|---|---|---|---|
|  | 3.97 | 3.71 | 85 | 93 | 91 | 2.06 |
| 5 | 3.91 | 3.74 | 87 | 96 | 91 | 2.08 |
| 10 | 4.12 | 3.85 | 87 | 95 | 91 | 2.14 |
| 15 | 4.17 | 3.89 | 86 | 95 | 91 | 2.16 |
| 20 | 4.14 | 3.85 | 86 | 95 | 90 | 2.14 |
| 25 | 4.03 | 3.74 | 85 | 95 | 90 | 2.08 |
| 30 | 3.90 | 3.62 | 85 | 95 | 90 | 2.01 |
| 40 | 3.67 | 3.40 | 85 | 95 | 90 | 1.89 |

TABLE 6

Operation results of redox flow battery using the electrolyte of Comparative Example 2

| Operation cycle | Charge capacity (Ah) | Discharge capacity (Ah) | EE (%) | CE (%) | VE (%) | V utility rate (AhL/mol) |
|---|---|---|---|---|---|---|
|  | 3.09 | 2.93 | 86 | 95 | 90 | 1.94 |
| 10 | 3.10 | 2.97 | 86 | 96 | 90 | 1.98 |
| 20 | 3.12 | 2.98 | 86 | 96 | 90 | 1.99 |
| 40 | 2.99 | 2.86 | 85 | 96 | 89 | 1.91 |
| 70 | 2.80 | 2.68 | 84 | 96 | 88 | 1.79 |
| 100 | 2.67 | 2.56 | 84 | 96 | 88 | 1.70 |

TABLE 7

Operation results of redox flow battery using the electrolyte of Example 2

| Cycle | Charge capacity (Ah) | Discharge capacity (Ah) | EE (%) | CE (%) | VE (%) | V utility rate (AhL/mol) |
|---|---|---|---|---|---|---|
|  | 3.24 | 3.10 | 85 | 93 | 91 | 2.07 |
| 5 | 3.16 | 3.10 | 87 | 96 | 91 | 2.07 |
| 10 | 3.13 | 3.08 | 87 | 96 | 91 | 2.07 |
| 15 | 3.01 | 2.97 | 86 | 96 | 90 | 1.98 |
| 20 | 2.97 | 2.90 | 86 | 95 | 90 | 1.93 |

TABLE 8

Operation results of redox flow battery using the electrolyte of Comparative Example 3

| Cycle | Charge capacity (Ah) | Discharge capacity (Ah) | EE (%) | CE (%) | VE (%) | V utility rate (AhL/mol) |
|---|---|---|---|---|---|---|
|  | 3.37 | 3.22 | 83 | 96 | 87 | 1.79 |
| 10 | 3.46 | 3.37 | 85 | 97 | 87 | 1.87 |
| 20 | 3.52 | 3.40 | 84 | 97 | 87 | 1.89 |
| 40 | 3.22 | 3.12 | 83 | 97 | 86 | 1.73 |
| 70 | 2.87 | 2.78 | 82 | 97 | 85 | 1.55 |
| 100 | 2.70 | 2.61 | 82 | 97 | 85 | 1.45 |

TABLE 9

Operation results of redox flow battery using the electrolyte of Comparative Example 4

| Cycle | Charge capacity (Ah) | Discharge capacity (Ah) | EE (%) | CE (%) | VE (%) | V utility rate (AhL/mol) |
|---|---|---|---|---|---|---|
|  | 2.98 | 2.78 | 82 | 93 | 87 | 1.81 |
| 10 | 2.91 | 2.80 | 83 | 96 | 86 | 1.86 |
| 20 | 2.87 | 2.76 | 82 | 96 | 86 | 1.84 |
| 40 | 2.60 | 2.50 | 81 | 96 | 85 | 1.67 |
| 70 | 2.38 | 2.28 | 81 | 96 | 85 | 1.52 |
| 100 | 2.14 | 2.05 | 81 | 96 | 85 | 1.36 |

As shown in the results of Tables 4 to 9 and FIGS. 1 to 4, it was found that the redox flow batteries of Examples 1 and 2 had higher discharge capacity and energy efficiency as compared to the redox flow batteries of Comparative Examples 1 to 4, respectively, and the efficiency and performance of the redox flow batteries of Examples 1 and 2 did not greatly deteriorate even if the operation cycle was increased, as compared to the redox flow batteries of Comparative Examples 1 to 4.

(6) Measurement of Internal Resistance of Redox Flow Battery

Internal resistances of the redox flow batteries using the electrolytes obtained in the examples and the comparative examples, respectively, were measured using HIOKI BT3563.

The measurement results thereof are shown in Table 10 below.

TABLE 10

Results of measurement of internal resistance

| Classification | Internal resistance ($\Omega * cm^2$) |
|---|---|
| Comparative Example 1 | 1.40 |
| Example 1 | 1.09 |
| Comparative Example 2 | 1.33 |

TABLE 10-continued

Results of measurement of internal resistance

| Classification | Internal resistance ($\Omega * cm^2$) |
|---|---|
| Example 2 | 1.12 |
| Comparative Example 3 | 1.75 |
| Comparative Example 4 | 1.68 |

As given in Table 10 above, it was found that the redox flow batteries using the electrolytes obtained in Examples 1 and 2 had lower internal resistances as compared to the redox flow batteries using the electrolytes obtained in Comparative Examples 1 to 4.

The invention claimed is:

1. A method for preparing a cathode electrolyte for redox flow batteries comprising the steps of: forming a first cathode electrolyte by reducing vanadium pentoxide ($V_2O_5$) in an acidic solution in the presence of at least one reducing compound selected from the group consisting of dicarboxylic acid containing a linear or branched alkylene group having 0 to 6 carbon atoms, hydrazine, and L-ascorbic acid;

forming a second cathode electrolyte by reducing vanadium pentoxide ($V_2O_5$) in an acidic solution in the presence of a linear or branched aliphatic alcohol having 2 to 10 carbon atoms; and mixing the first cathode electrolyte and the second cathode electrolyte.

2. The method for preparing a cathode electrolyte for redox flow batteries according to claim 1, wherein the first cathode electrolyte and the second cathode electrolyte are mixed in a volume ratio of 12:1 to 1:1.

3. The method for preparing a cathode electrolyte for redox flow batteries according to claim 1, wherein a concentration of the acidic solution in the first cathode electrolyte and the second cathode electrolyte is 0.1 M to 6 M.

4. The method for preparing a cathode electrolyte for redox flow batteries according to claim 1, wherein the acidic solutions in the first cathode electrolyte and the second cathode electrolyte contain sulfuric acid, respectively.

5. The method for preparing a cathode electrolyte for redox flow batteries according to claim 1, wherein a concentration of the vanadium pentoxide in the first cathode electrolyte and the second cathode electrolyte is 0.3 M to 3 M, respectively.

6. The method for preparing a cathode electrolyte for redox flow batteries according to claim 1, wherein a concentration of the reducing compound in the first cathode electrolyte is 0.3 M to 3 M, and a concentration of the aliphatic alcohol in the second cathode electrolyte is 0.3 M to 3 M.

7. The method for preparing a cathode electrolyte for redox flow batteries according to claim 1, wherein a ratio of the concentration of the reducing compound relative to the concentration of vanadium pentoxide in the first cathode electrolyte is 0.8 to 1.2.

8. The method for preparing a cathode electrolyte for redox flow batteries according to claim 1, wherein a ratio of the concentration of the aliphatic alcohol relative to the concentration of vanadium pentoxide in the second cathode electrolyte is 0.8 to 1.2.

9. A redox flow battery, comprising:

a cathode electrolyte for redox flow batteries prepared by the method of claim 1;

metal ions containing a $V^{2+}/V^{3+}$ redox couple; and an anode electrolyte containing a sulfuric acid solution.

10. The redox flow battery according to claim 9, wherein the redox flow battery includes at least one unit cell, the unit cell comprising:

a separation membrane through which ions pass;

a pair of electrodes opposite to the center of the separation membrane; and the cathode electrolyte and anode electrolyte which are present respectively in a cathode cell and an anode cell partitioned by the separation membrane.

11. The redox flow battery according to claim 9, wherein the unit cell further includes a pair of flow frames attached to face each other on respective sides of the separation membrane.

12. The redox flow battery according to claim 9, wherein the unit cell further includes a cell frame formed on the outer surface of the electrodes.

13. The redox flow battery according to claim 9, further comprising:

a cathode electrolyte tank for storing the cathode electrolyte;

a cathode electrolyte pump for circulating the cathode electrolyte from the cathode electrolyte tank to the cathode cell of the unit cell during charge and discharge;

an anode electrolyte tank for storing the anode electrolyte; and an anode electrolyte pump for circulating the anode electrolyte from the anode electrolyte tank to the anode cell of the unit cell during charge and discharge.

* * * * *